(12) United States Patent
Lee

(10) Patent No.: US 10,920,930 B2
(45) Date of Patent: Feb. 16, 2021

(54) GREASE INJECTION NIPPLE

(71) Applicant: AHWON CORPORATION, Gunpo-si (KR)

(72) Inventor: Juho Lee, Gunpo-si (KR)

(73) Assignee: AHWON CORPORATION, Gunpo-si (KR)

( * ) Notice: Subject to any disclaimer, the term of this patent is extended or adjusted under 35 U.S.C. 154(b) by 335 days.

(21) Appl. No.: 16/309,394

(22) PCT Filed: Nov. 15, 2017

(86) PCT No.: PCT/KR2017/012907
§ 371 (c)(1),
(2) Date: Dec. 12, 2018

(87) PCT Pub. No.: WO2018/093125
PCT Pub. Date: May 24, 2018

(65) Prior Publication Data
US 2019/0331294 A1    Oct. 31, 2019

(30) Foreign Application Priority Data

Nov. 18, 2016 (KR) ........................ 10-2016-0153699

(51) Int. Cl.
*F16N 21/02* (2006.01)
*F16N 3/12* (2006.01)
(Continued)

(52) U.S. Cl.
CPC .............. *F16N 21/02* (2013.01); *F16N 3/12* (2013.01); *B62D 55/092* (2013.01); *F16K 1/36* (2013.01);
(Continued)

(58) Field of Classification Search
CPC .......... F16N 21/02; F16N 21/04; F16N 21/06; F16N 3/12; F16N 2021/005; B62D 55/092; F16K 1/36; F16K 31/44
See application file for complete search history.

(56) References Cited

U.S. PATENT DOCUMENTS 1,703,286 A * 2/1929 Zerk .......................... F16N 3/12
222/321.6
1,928,824 A * 10/1933 Zerk ....................... F16N 21/04
285/9.2
(Continued)

FOREIGN PATENT DOCUMENTS

JP  2012-233538 A  11/2012
KR  10-2010-0107250 A  10/2010
(Continued)

*Primary Examiner* — Michael A Riegelman
(74) *Attorney, Agent, or Firm* — Heedong Chae; Lucem, PC

(57) ABSTRACT

The present invention relates to a grease injection nipple coupled to a grease pipe such that the same can function as an opening/closing valve with regard to the corresponding grease pipe, the grease injection nipple being pushed against a nipple of a grease supply target and coupled thereto or separated therefrom. The grease injection nipple according to the present invention comprises a push body, a check valve, a nipple coupling portion, and a valve activation portion. The valve activation portion may operate such that, when the push body makes a primary movement in the forward direction, the check valve is opened and, when the push body makes a secondary movement in the forward direction after external force for the primary movement of the push body is released, the check valve is closed.

10 Claims, 12 Drawing Sheets

(51) Int. Cl.
*B62D 55/092* (2006.01)
*F16K 1/36* (2006.01)
*F16K 31/44* (2006.01)
*F16N 21/00* (2006.01)

(52) U.S. Cl.
CPC ........ *F16K 31/44* (2013.01); *F16N 2021/005* (2013.01)

(56) References Cited

U.S. PATENT DOCUMENTS

| | | | | |
|---|---|---|---|---|
| 2,070,013 A * | 2/1937 | Krannak | ............... | F16L 37/127 285/316 |
| 2,168,915 A * | 8/1939 | Ostendorf | ............... | F16N 21/04 251/149.1 |
| 2,263,850 A * | 11/1941 | Nielsen | ................... | F16N 21/04 285/102 |
| 2,274,753 A * | 3/1942 | Sundholm | ............... | F16N 21/04 285/102 |
| 2,311,097 A * | 2/1943 | Sundholm | ............... | F16N 21/04 184/105.1 |
| 2,314,374 A * | 3/1943 | Sundholm | ............... | F16N 21/04 184/105.1 |
| 2,362,880 A * | 11/1944 | Campbell | ............... | F16N 21/04 184/105.1 |
| 2,396,499 A * | 3/1946 | Fitch | ....................... | F16N 21/04 285/306 |
| 2,425,692 A * | 8/1947 | Clapp | ..................... | F16N 21/04 184/105.1 |
| 2,533,637 A * | 12/1950 | Tear | ........................ | F16N 21/04 285/102 |
| 2,578,517 A * | 12/1951 | Davis | ...................... | F16N 21/04 285/306 |
| 2,594,320 A * | 4/1952 | Le Clair | ................. | F16N 21/04 141/349 |
| 2,675,829 A * | 4/1954 | Livers | ................... | F16L 37/133 137/614.06 |
| 2,714,021 A * | 7/1955 | Froidevaux | ............. | F16N 21/04 285/102 |
| 2,754,135 A * | 7/1956 | Kramer | ................... | F16N 21/04 285/101 |
| 2,764,769 A * | 10/1956 | Chaim | .................... | F16N 21/04 15/105 |
| 3,924,708 A * | 12/1975 | Dabrowka | ............... | F01M 1/04 184/105.1 |
| 4,195,812 A * | 4/1980 | Norcross | ................. | F16N 21/04 251/148 |
| 4,607,727 A * | 8/1986 | Jochum | ..................... | F16N 3/12 184/105.1 |
| 10,415,749 B2 * | 9/2019 | Hung | ...................... | F16N 21/04 |
| 2012/0267890 A1 * | 10/2012 | Gurney | ................. | F16L 37/138 285/308 |
| 2015/0115601 A1 * | 4/2015 | Boucher | ............... | F16L 37/407 285/325 |
| 2019/0331294 A1 * | 10/2019 | Lee | ......................... | F16N 21/04 |
| 2020/0032957 A1 * | 1/2020 | Salomon | ............... | F16N 21/04 |

FOREIGN PATENT DOCUMENTS

| | | |
|---|---|---|
| KR | 10-2012-0012516 A | 2/2012 |
| KR | 10-2013-0021890 A | 3/2013 |
| KR | 10-1558278 B1 | 10/2015 |

\* cited by examiner

GREASE INJECTION NIPPLE

CROSS-REFERENCE TO RELATED APPLICATIONS

This application is based on and claims the benefit of priority to Korean Patent Application No. 10-2016-0153699 filed on Nov. 18, 2016, with the Korean Intellectual Property Office, the disclosure of which is incorporated herein by reference.

TECHNICAL FIELD

The present invention relates to a grease injection nipple coupled to a grease pipe such that the same can function as an opening/closing valve with regard to the corresponding grease pipe, the grease injection nipple being pushed against a nipple of a grease supply target and coupled thereto or separated therefrom such that the grease injection nipple is easily fastened thereto and supply of grease or interruption of the supply simultaneously occurs and is interlinked therewith, and the grease injection nipple being configured such that the leakage of the grease is prevented in the process of fastening, separating, and injecting the grease in the fastened condition.

BACKGROUND ART

In general, grease is a kind of a lubricant supplied to form an oil film between components of a rotating portion, such as a roller and a bearing, subjected to large loads.

The grease includes various products depending on use, composition and properties, in which most of the products are manufactured by adding a metallic soap and a small amount of water into liquid mineral oil-based lubricant and mixing the lubricant in a colloid state, and usually formed in a butter form.

Since the range of use of the grease is not limited, the grease is used in various kinds of devices, systems, and actuators in various industrial fields.

When the grease is not supplied between rotating components of machine, wear, abrasion, breakage, or the like may occur due to friction between the rotating components or between the rotating components and peripheries. Thus, an operator is required to frequently check an amount of the grease and sufficiently provide the grease when replenishment is needed.

In addition, since the grease has high viscosity, a grease barrel pump is typically used for relatively large amounts of grease, and a grease gun is mainly used when small amounts of grease are injected.

FIG. 1 shows an example of the grease gun. As shown in the drawing, the grease gun 10 has a body 11 equipped with a handle 12 and mount thereon with a handle-type on/off valve 13 for opening and closing a grease pipe 14, and a check-type nipple 15 is mounted on a tip of the grease pipe 14, in which the check-type nipple 15 is fastened in an inserting manner to a nipple (not shown) of a grease supply target.

According to the above configuration, the user of the grease gun 10 pulls the handle-type on/off valve 13 of the grease gun 10 after pushing and inserting the check-type nipple 15 of the grease gun 10 to the nipple of the grease supply target, and thus the grease is injected while the grease pipe 14 is opened.

In addition, after the injection of grease is completed, the handle-type on/off valve 13 of the grease gun 10 is pulled again to close the grease pipe 14 and then the check-type nipple 15 of the grease gun 10 is pushed to be separated from the nipple of the grease supply target.

However, when the check-type nipple 15 of the grease gun 10 is not easily separated from the nipple of the grease supply target, the grease maintaining the high pressure state in the grease pipe 14 is discharged to the space between the check-type nipple 15 of the grease gun 10 and the nipple of the grease supply target, as a result, the loss of the grease occurs and a periphery of at least one of the check-type nipple 15 of the grease gun 10 and the nipple of the grease supply target is contaminated with the grease.

In addition, the handle-type on/off valve is required to be pulled upon supply of grease or interruption of the supply, thereby causing a great inconvenience in supplying the grease.

DOCUMENT OF CONVENTIONAL ART

Patent Document (Patent Document 1) Korean Patent Registration No. 10-1274921 (Publication on Jun. 17, 2013), "GREASE VALVE"

(Patent Document 2) Korean Patent Registration No. 10-2013-0111742 (Publication on Oct. 11, 2013), "AIR TYPE GREASE WITH GREASE CARTRIDGE SUPPLIES"

DISCLOSURE

Technical Problem

An embodiment of the present invention provides a grease injection nipple coupled to a grease pipe such that the same can function as an opening/closing valve with regard to the corresponding grease pipe.

In addition, an embodiment of the present invention provides a grease injection nipple being pushed against a nipple of a grease supply target and coupled thereto or separated therefrom such that the grease injection nipple is easily fastened thereto and supply of grease or interruption of the supply simultaneously occurs and is interlinked therewith, and the grease injection nipple being configured such that the leakage of the grease is prevented in the process of fastening, separating, and injecting the grease in the fastened condition.

In addition, an embodiment of the present invention provides a grease injection nipple for maintaining a firm engagement with a nipple of a grease supply target without an additional supporting operation by user's hand or other external force in the process of supplying the grease in combination with the nipple of the grease supply target.

Technical Solution

The grease injection nipple according to an embodiment of the present invention may include: a push body including a first grease supply hole formed rearward and a second grease supply hole extending forward while communicating with the first grease supply hole and having an inner diameter smaller than an inner diameter of the first grease supply hole, in which an inside of the push body communicates with the second grease supply hole while being opened forward; a check valve pressed forward to close a connection part between the first grease supply hole and the second grease supply hole of the push body; a nipple coupling portion having a rear side inserted into the inside of the push body, and having a deployed structure configured to allow the nipple coupling portion to be inserted more into the inside of the push body when the push body moves forward in order to increase force for pressing an outer surface of a nipple of a grease supply target inserted into the inside of the push body; and a valve activation portion for opening the check valve when the push body primarily moves forward, and closing the check valve when the push body secondarily moves forward after releasing external force for enabling the push body to primarily move.

In addition, the push body may include a first body portion having the first grease supply hole formed rearward and a grease supply pipe, which is formed therein with the second grease supply hole and extends forward; and a second body portion in which the grease supply pipe is inserted through a rear side of the second body portion, and a rear side of the nipple coupling portion is inserted into one end of a front side of the second body portion.

In addition, the first body portion and the second body portion may be integrated as a single body or independently provided and coupled to each other.

In addition, the first body portion and the second body portion prepared as independent bodies may be formed along a periphery thereon with a latching groove, and the push body further includes a fastening member in which both front and rear ends of the fastening member are inserted into the latching grooves of the first body portion and the second body portion, respectively, to couple the first body portion to the second body portion.

In addition, the valve activation portion may include: a push member formed inside the second body portion in which the grease supply pipe passes through the push member and a saw-tooth-shaped rotation and fixation guide sill is continuously formed along a circumferential direction of a front end of the push member; a rotation member having a hollow structure extending in a longitudinal direction such that the grease supply pipe is inserted into a rear side of the rotation member, formed on an outer surface thereof with one or at least two guide protrusions disposed along a circumferential direction of the rotation member, and having a front outer side coupled to the nipple coupling portion; and an elastic recovery member provided inside the rotation member and pressed when the push body moves forward to apply elasticity to a rear side of the first body portion, wherein the second body portion is continuously formed on an inner circumferential surface thereof with a rotation and fixation guide portion including a protrusion guide groove for guiding the guide protrusion along a length direction, a first inclined surface slantingly extending from an opened rear side of the protrusion guide groove, a protrusion fixing groove connected to the first inclined surface such that the guide protrusion guided from the first inclined surface is fixedly inserted into the protrusion fixing groove, and a second inclined surface slantingly extending from the opened rear side of the protrusion fixing groove and connected to an opposite side of the protrusion guide groove from which the first inclined surface does not extend.

In addition, the rotation member may include a pressing force generation portion formed on a rear end thereof with the guide protrusion, and a nipple insertion portion connected to a front end of the pressing force generation portion through a connection pipe having a reduced diameter, and the nipple coupling portion includes a plurality of unit coupling members each formed at both ends in the longitudinal direction thereof with bent portions in which a rearward bent portion is inserted between the pressing force generation portion and the nipple insertion portion inside a second push body, and a front bent portion is mounted to a front end of the nipple insertion portion.

In addition, the nipple insertion portion may have a tapered outer surface having an outer diameter gradually reduced rearward, and the unit coupling members may be disposed to form a taper from a front side of the second push body and deployed such that a distance between the front sides of the unit coupling members becomes narrow when the second push body moves forward, and the distance between the front sides of the unit coupling members becomes wide when the second push body moves rearward.

In addition, the valve activation portion may further include an elastic grease discharge member provided inside the nipple coupling portion while communicating with the rotation member, formed with a tapered grease outlet which extends in a length direction and has a width gradually decreased forward, and contracted and recovered according to a deployment of the nipple coupling portion.

In addition, the push member may be configured to have an independent structure in which at least one fixing protrusion is formed along a circumferential direction on the outer surface of the push member, and the fixing protrusion is inserted into the fixing groove formed on an inner surface of the second body portion and fixed to the inside of the second body portion.

In addition, the check valve may include a valve body including a valve head having an inner diameter larger than an inner diameter of the second grease supply hole to open and close the second grease supply hole at a connection part between the first grease supply hole and the second grease supply hole, and a valve bar extending from the valve head with a reduced diameter and inserted into the second grease supply hole; and an elastic member for applying elasticity to the valve head from an inside the first grease supply hole in a direction in which the valve head closes the connection part between the first grease supply hole and the second grease supply hole.

Advantageous Effects

According to an embodiment of the present invention, the grease injection nipple mounted on a grease gun, a grease pump, or the like is coupled to a grease pipe such that the same can function as an opening/closing valve with regard to the corresponding grease pipe.

In addition, the grease injection nipple mounted on a grease gun, a grease pump, or the like is pushed against a nipple of a grease supply target and coupled thereto or separated therefrom such that the grease injection nipple can be easily fastened thereto and supply of grease or interruption of the supply simultaneously occurs and is interlinked therewith, and the grease injection nipple being configured such that the leakage of the grease can be prevented in the process of fastening, separating, and injecting the grease in the fastened condition.

In addition, the grease injection nipple mounted on a grease gun, a grease pump, or the like can maintain a firm engagement with the nipple of the grease supply target without an additional supporting operation by user's hand or other external force in the process of supplying the grease in combination with the nipple of the grease supply target.

BEST MODE

Mode for Invention

Figure 1:
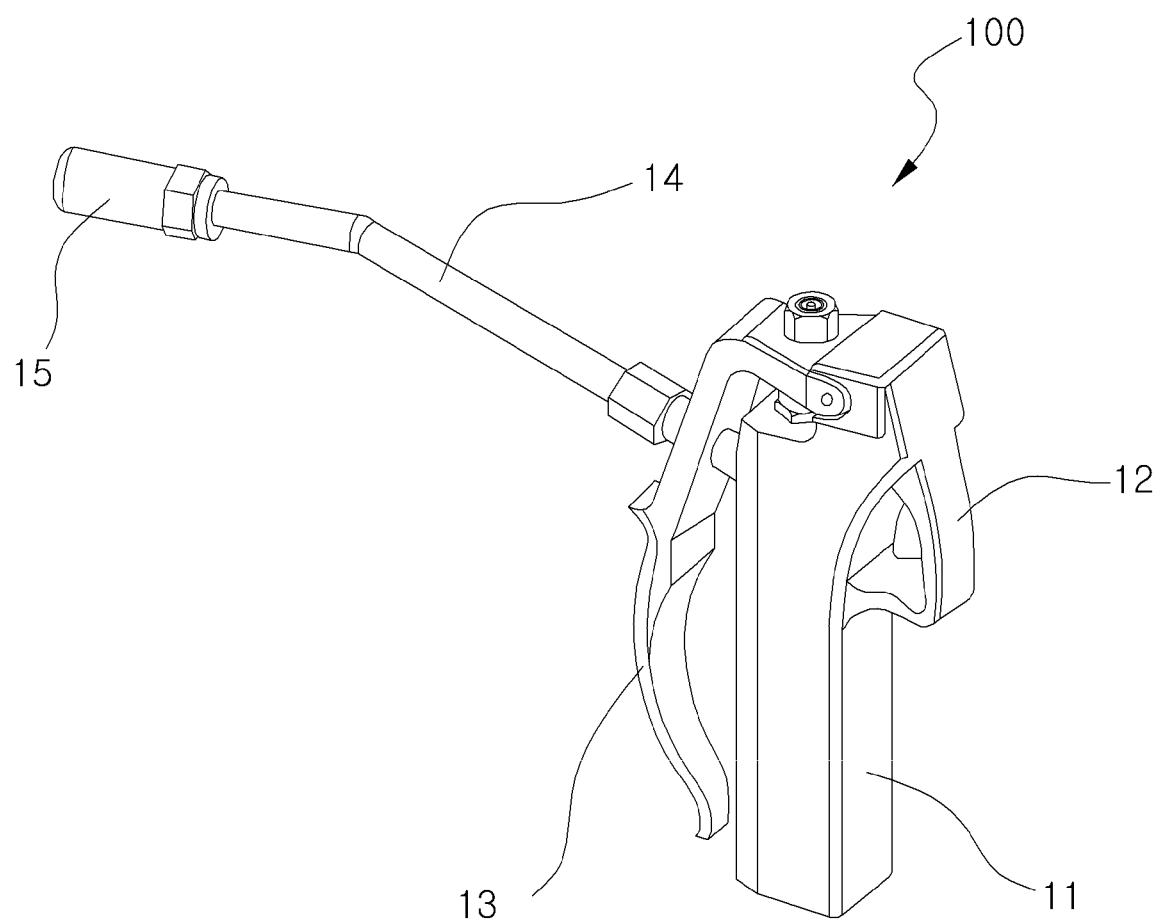
FIG. 1 is a perspective view showing an example of a conventional grease gun.

Hereinafter, the detailed descriptions of the present invention are embodiments for carrying out the present invention, and the corresponding embodiment refers to the accompanying drawings as an example.

The embodiments will be described in detail to enable those skilled in the art to carry out the present invention.

It is apparent to be understood that the various embodiments of the present invention may be different from each other but do not need to be mutually exclusive.

For example, the particular shape, structure, and feature described herein may be embodied in other embodiments without departing from the idea and scope of the present invention in connection with the embodiment.

In addition, it shall be understood that the location or arrangement of an individual element within each disclosed embodiment may be modified without departing from the idea and scope of the present invention.

Accordingly, the following detailed description does not disclose a limited meaning, and the scope of the invention is limited only by the appended claims, along with the full scope of equivalents to which the claims are entitled, if properly explained.

Similar reference numerals in the drawings refer to the same or similar function throughout several aspects.

General term which is widely used recently has been selected in the present invention in consideration of the function according to the present invention as possible, however, the term may vary depending on the intention of those skilled in the art, judicial cases, the advent of new technology, or the like.

In addition, the term may be arbitrarily selected by the applicant in certain cases, and thus the meaning thereof will be described in detail in the relevant description of the invention.

Therefore, the term used in the present invention should be defined based on the meaning of the term and contents throughout the present invention, not simply on the name of the term.

In the present invention, when one part "includes" one element, the above expression does not exclude other elements, but may further include the other elements unless particularly stated otherwise.

In addition, the term " . . . unit", " . . . module", or an equivalent thereof means a unit for processing at least one function or operation, and may be implemented in hardware or software, or in a combination of hardware and software.

The grease injection nipple according to an embodiment of the present invention will be described with reference to FIGS. 2 to 10.

Figure 2:
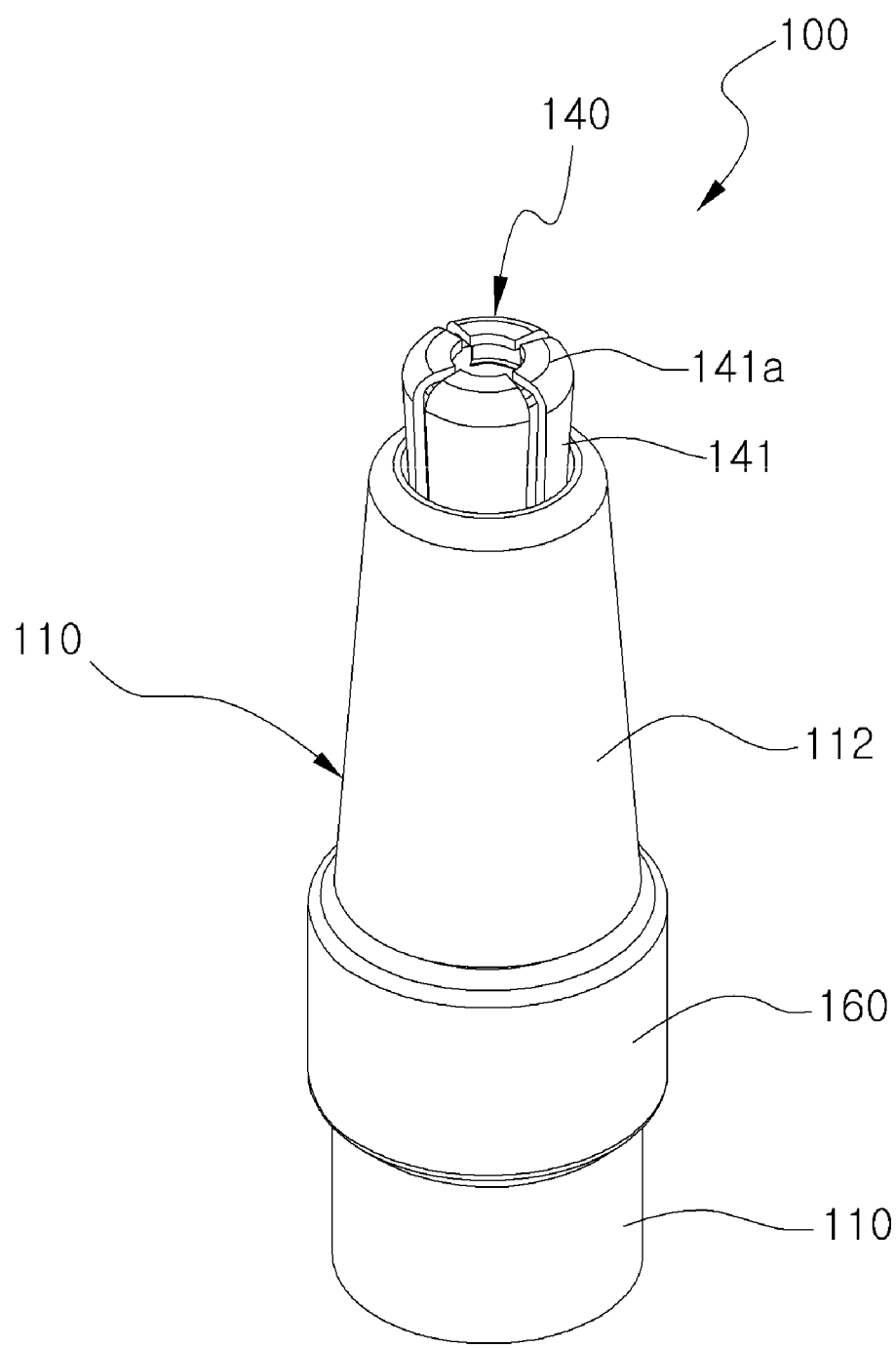
FIG. 2 is a perspective view of a grease injection nipple according to an embodiment of the present invention.
Figure 3:
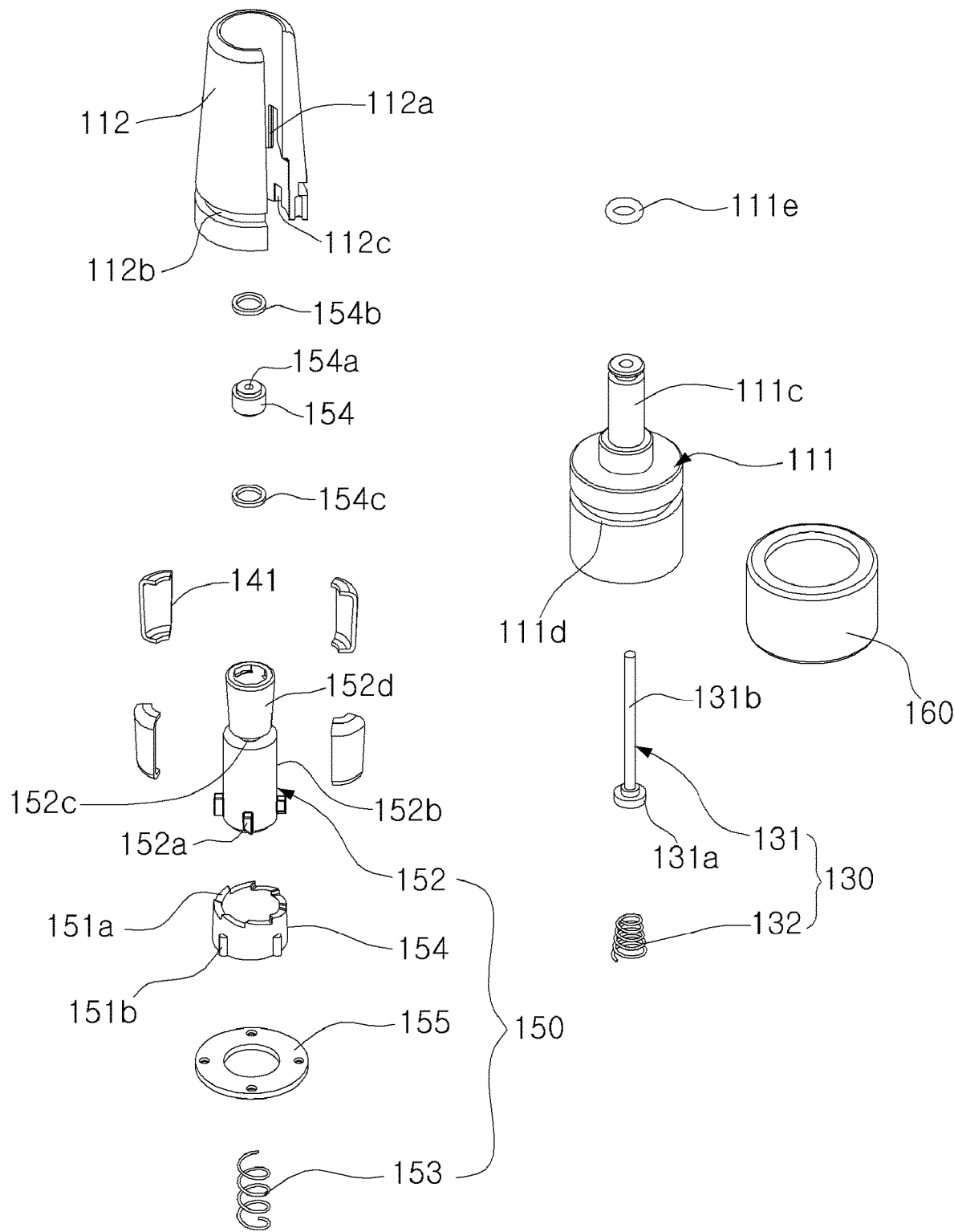
FIG. 3 is a perspective view showing a disassembled state of a grease injection nipple according to an embodiment of the present invention.
Figure 4:
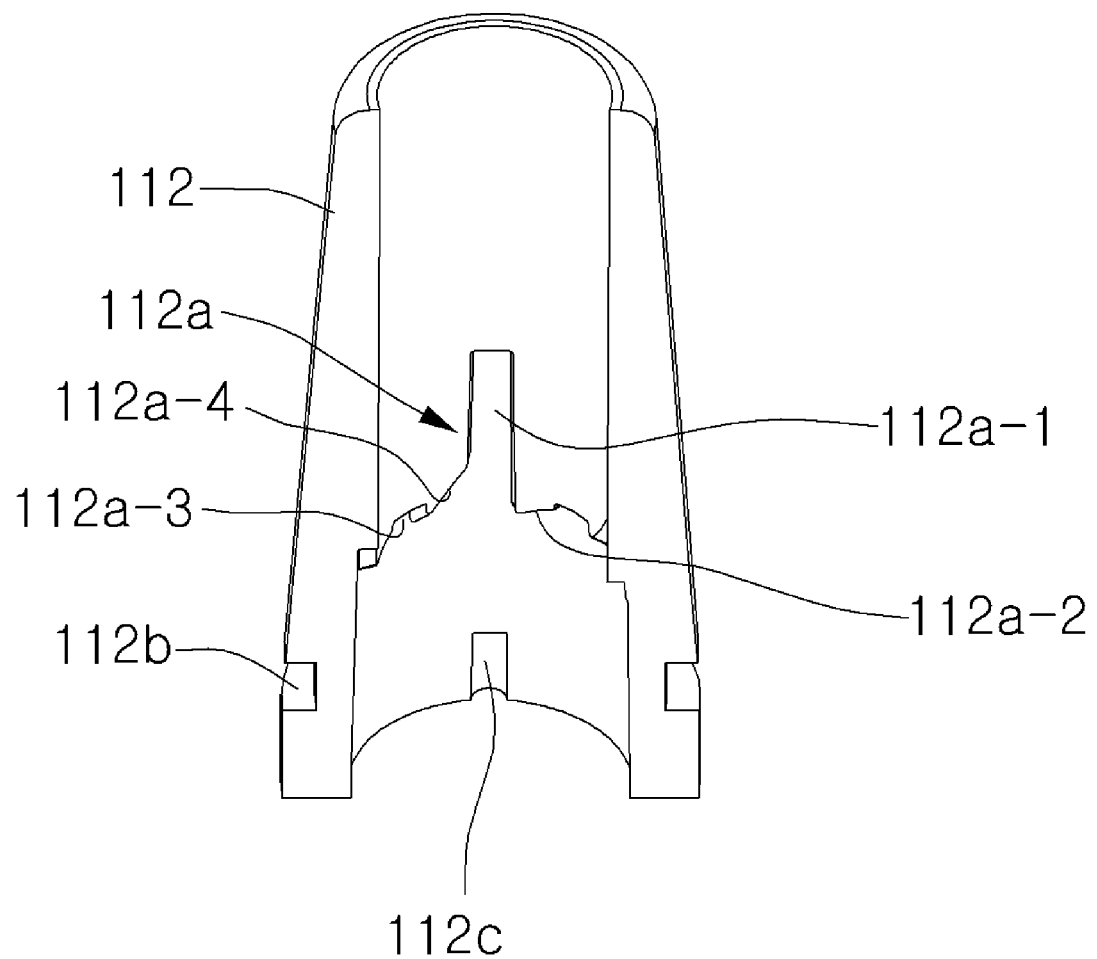
FIG. 4 is a perspective view illustrating an inner surface of a push body in a grease injection nipple according to an embodiment of the present invention.
Figure 5:
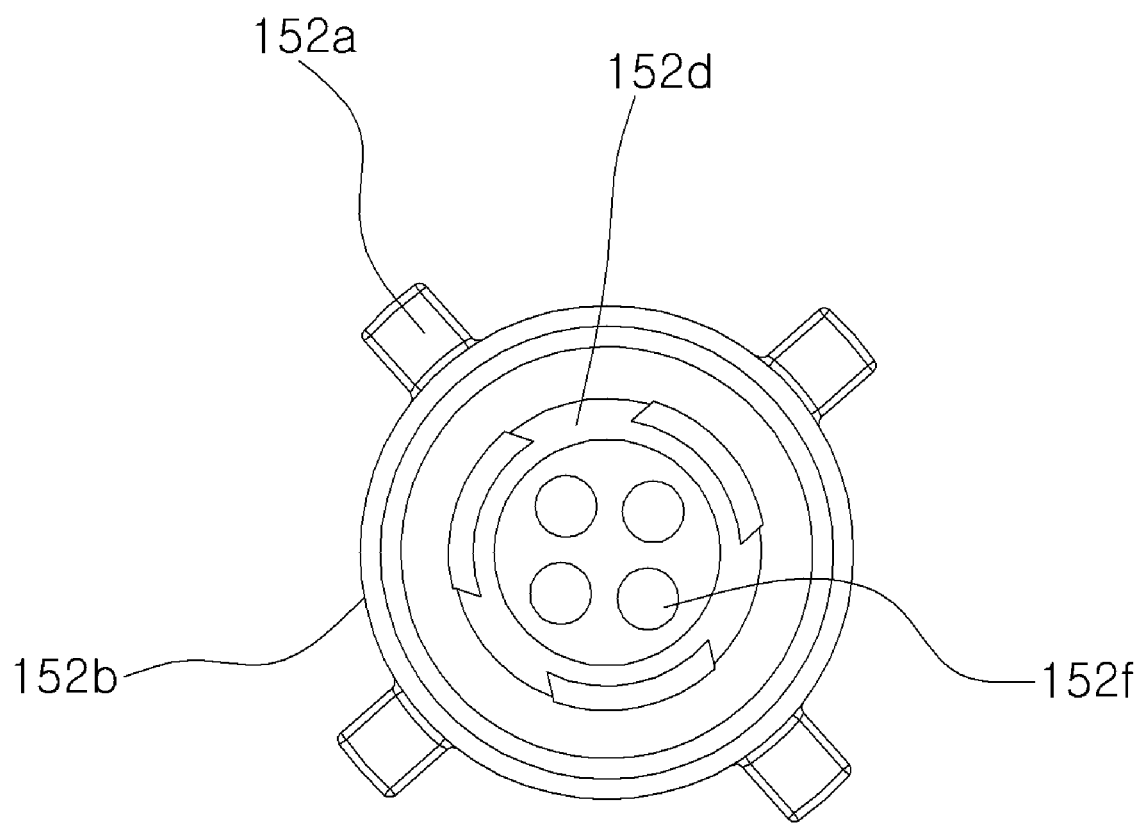
FIG. 5 is a plan view illustrating a rotation member in a grease injection nipple according to an embodiment of the present invention, as viewed from above.
Figure 6:
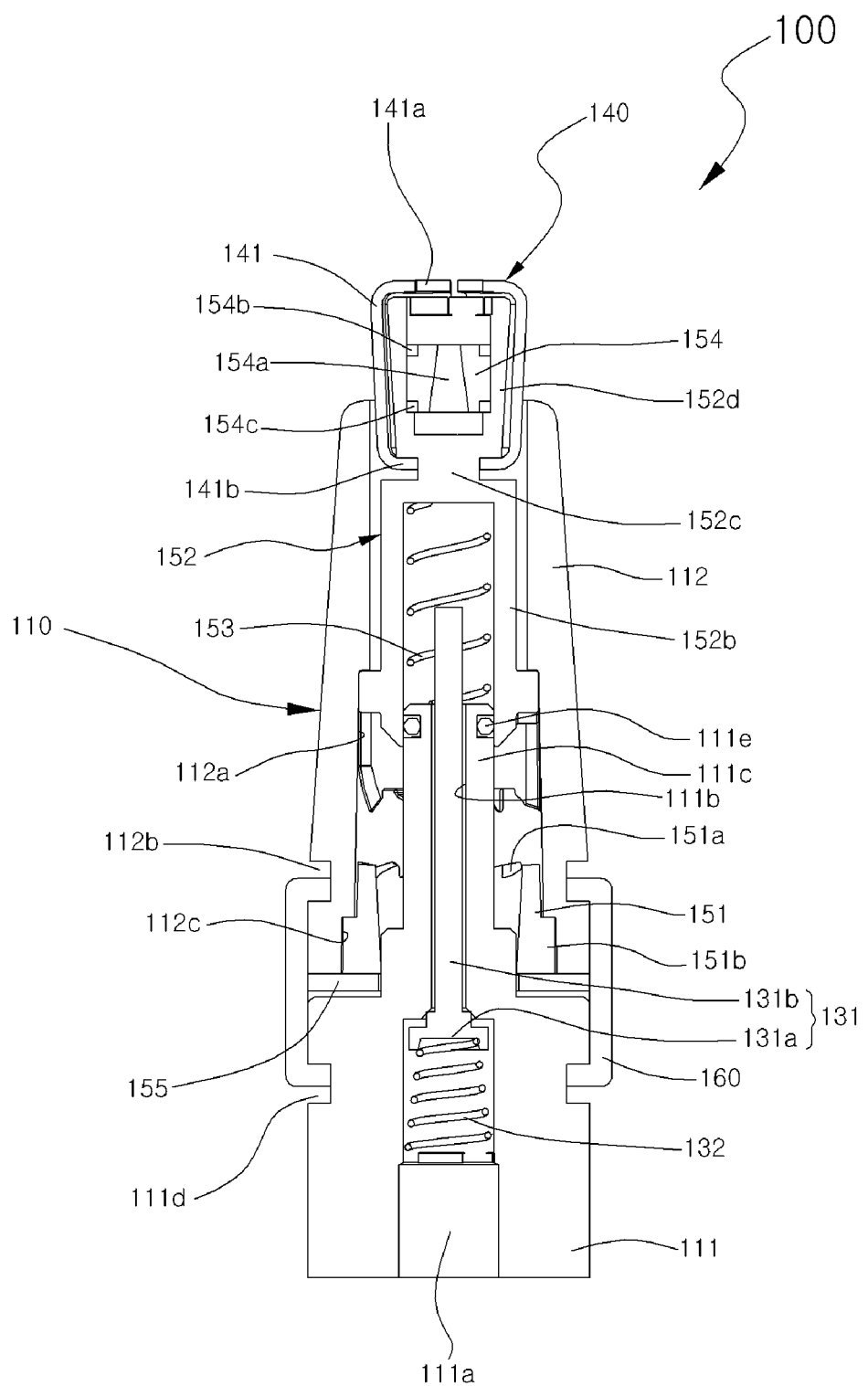
FIG. 6 is a sectional view of a grease injection nipple according to an embodiment of the present invention.

FIG. 2 is a perspective view of a grease injection nipple according to an embodiment of the present invention. FIG. 3 is a perspective view showing a disassembled state of a grease injection nipple according to an embodiment of the present invention. FIG. 4 is a perspective view illustrating an inner surface of a push body in a grease injection nipple according to an embodiment of the present invention. FIG. 5 is a plan view illustrating a rotation member in a grease injection nipple according to an embodiment of the present invention, as viewed from above. FIG. 6 is a sectional view of a grease injection nipple according to an embodiment of the present invention.

As shown in the drawing, the grease injection nipple 100 according to one embodiment of the present invention may include a push body 110, a check valve 130, a nipple coupling portion 140, and a valve activation portion 150.

In addition, the grease injection nipple 100 according to one embodiment of the present invention may further include a fastening member 160.

Prior to the description, the direction from the check valve 130 toward the nipple coupling portion 140 is referred to as a forward direction and the direction opposite to the forward direction is referred to as a rearward direction. Accordingly, hereinafter the description for the forward and rearward is based on the above-described standard.

The push body 110 includes a first grease supply hole 111a formed rearward and a second grease supply hole 111b extending forward while communicating with the first grease supply hole 111a and having an inner diameter smaller than that of the first grease supply hole 111a, and has an inside communicating with the second grease supply hole 111b and opened forward.

In addition, the push body 110 may be configured to include a first body portion 111 and a second body portion 112, but the present invention is not limited thereto. Hereinafter, the push body 110 including the first body portion 111 and the second body portion 112 will be described as an example.

The first body part 111 is configured to have the first grease supply hole 111a formed rearward, and have a grease supply pipe 111c formed therein with the second grease supply hole 111b and extending forward.

The second body portion 112 is configured that the grease supply pipe 111c of the first body portion 111 is inserted through a rear side of the second body portion 112, and a rear side of the nipple coupling portion 140 is inserted into a front end of second body portion.

In addition, the first body portion 111 and the second body portion 112 may be integrated as a single body or independently provided and coupled to each other. In this embodiment, the first body portion 111 and the second body portion 112 are illustrated to be independently provided and coupled to each other.

When described in detail based on the present embodiment, the second body portion 112 is formed through along the longitudinal direction, and coupled to a front of the first body portion 111 in a state that the grease supply pipe 111c of the first body portion 111 is inserted through the rear side of the second body portion 112.

In addition, the first body portion and the second body portion, which are independently provided, may be formed along peripheries thereon with latching grooves 111d and 112b, respectively, and the first body portion 111 may be coupled to the second body portion 112 through the latching grooves 111d and 112b of the first and second body portions 111 and 112 and the fastening member 160.

In other words, both front and rear ends of the fastening member 160 are inserted into the latching grooves of the first body portion 111 and the second body portion 112, respectively, thereby fastening the first body portion 111 to the second body portion 112.

Non-described reference numeral 111e denotes an O-ring coupled to a front of the grease supply pipe 111c of the first body portion 111.

The check valve 130 is configured to be pressed forward to forwardly press and close a connection part between the first grease supply hole 111a and the second grease supply hole 111b of the push body 110.

When described with reference to the present embodiment, the check valve 130 is configured to close the connection part between the first grease supply hole 111a and the grease supply pipe 111c of the first body portion 111. In other words, the check valve 130 opens the connection part between the first grease supply hole 111a and the grease supply pipe 111c when the external force is applied rearward.

In addition, the embodiment illustrates the check valve 130 including a valve body 131 and an elastic member 132, but the present invention is not limited thereto. In other words, various forms may be carried out within the range satisfying the condition that the check valve 130 is configured to be pressed forward to close the connection part between the first grease supply hole 111a and the grease supply pipe 111c of the first body portion 111. Hereinafter, the description will be based on the embodiment.

The valve body 131 includes a valve head 131a and a valve bar 131b, in which the valve head 131a is formed to be greater than an inner diameter of the grease supply pipe 111c of the first body portion 111 to open and close the connection part between the first grease supply hole 111a and the grease supply pipe 111c of the first body portion 111. In addition, the valve bar 131b has a reduced diameter, extends from the valve head 131a, and is inserted into the grease supply pipe 111c.

The elastic member 132 functions to apply elasticity to the valve head 131a inside the first grease supply hole 111a of the first body portion 110, in the direction of the valve head 131a closing the connection part between the first grease supply hole 111a and the grease supply pipe 111c of the first body portion 111.

The nipple coupling portion 140 has a rear side inserted into the inside of the push body 110 and has a deployed structure configured to allow the nipple coupling portion to be inserted more into the inside of the push body when the push body 110 moves forward in order to increase force for pressing an outer surface of a nipple of a grease supply target inserted into the inside of the push body.

When described with reference to the present embodiment, the nipple coupling portion 140 is installed inside the front side of the second body portion 112, in which the nipple coupling part 140 is inserted more into the second body portion 112 when the second body portion 112 moves forward and has a deployed structure to increase force for pressing the outer surface of the nipple of the grease supply target inserted therein.

In other words, the nipple coupling portion 140 inwardly inserts the nipple (not shown) of the grease supply target, in which, when the second body portion 112 moves forward in a state that the nipple of the grease supply target is inserted into the nipple coupling portion 140, the nipple coupling portion 140 strongly grips the nipple of the grease supply target while performing the closed deployment of coming into close contact with the outer surface of the nipple of the inserted grease supply target.

In addition, in a grease supply process of using the grease injection nipple 100 of the present embodiment, a firm fastening state is maintained between the grease injection nipple 100 and the nipple of the grease supply target, and thus leakage of the grease is prevented.

The valve activation portion 150 functions to open the check valve 130 when the push body 110 primarily moves forward, and close the check valve 130 when the push body 110 secondarily moves forward after releasing external force for enabling the push body 110 to primarily move.

When described with reference to the present embodiment, the valve activation portion 150 functions to open the check valve 130 when the first body portion 111 and the second body portion 121 move forward, and close the check valve 130 when the first body portion 111 and the second body portion 121 secondarily move after releasing external force for enabling the first body portion 111 and the second body portion 121 to primarily move.

Through a simple operation of pushing the grease injection nipple 100 according to an embodiment of the present invention, by using the valve activation portion 150, to allow the nipple of the grease supply target to be inserted into the grease injection nipple 100, the grease injection nipple 100 can be firmly fastened to the nipple of the grease supply target and a grease supplying operation can be performed in which the leakage is prevented. In other words, the grease injection nipple 100 according to an embodiment of the present invention has a function to open and close the grease pipe and a function to lock the nipple of the grease supply target, so that the grease injection nipple gun or a grease injection device to which the grease injection nipple 100 according to an embodiment of the present invention is applied can have a simplified structure and a reduced volume, and a grease supply function and convenience in use are improved.

In addition, by the grease injection nipple 100 according to an embodiment of the present invention, through a simple operation of pushing the grease injection nipple 100 once after the supply of the grease is completed, high pressure in the grease pipe (not shown) is released, so that the grease injection nipple 100 can be easily separated from the nipple of the grease supply target and the grease leakage can be prevented in the separation process.

In addition, the valve activation portion 150 may include a push member 151, a rotation member 152, and an elastic recovery member 153.

In addition, the valve activation portion 150 may further include a grease discharge member 154 and a stopper 155.

The push member 151 is provided inside the second body portion 112, in which the grease supply pipe 111c of the first body portion 111 passes through the push member 151, and a saw-tooth-shaped rotation and fixation guide sill 151a is continuously formed along the circumferential direction of a front end the push member 151.

The grease push member 151 may be integrally formed with the second body portion 112, or may be provided independently and coupled to the inside of the second body portion 112.

The embodiment herein illustrates the push portion 151 provided independently and coupled to the inside of the second body portion 112. In other words, the push member 151 has an independent structure in which at least one fixing protrusion 151b is formed along the circumferential direction of an outer surface the push member 151, and thus the fixing protrusion 151b of the push member 151 is inserted into the fixing groove 112c formed on an inner side of the second body portion 112, thereby being coupled and fixed to the inside of the second body portion 112.

In addition, the embodiment herein illustrates that at least one fixing protrusion 151b is formed on the outer surface of the push member 151 along the longitudinal direction, and the fixing protrusion 151b is inserted and fixed to the fixing groove 112c formed on the inner side of the second body portion 112, so that the push member 151 is fixed between one surface of the first body portion 111 and the inner surface of the second body portion 112, but the present invention is not limited thereto. In other words, various fixing structures may be used within the range of satisfying the condition that the push member 151 is fixed while the grease supply pipe 111c of the first body portion 111 passes between one surface of the first body portion 111 extending the grease supply pipe 112 and the inner surface of the second body portion 112.

The rotation member 152 is formed through along the longitudinal direction, and the grease supply pipe 111c of the first body portion 111 is inserted through the rear side of the rotation member 152. The rotation member 152 is formed on an outer surface thereof with at least one guide protrusion 152a along the circumferential direction, and the nipple coupling portion 140 is coupled to an outer side of the front side thereof.

In addition, the rotation member 152 may include a pressing force generation portion 152b formed at a rear end thereof with the guide protrusion 152a, and a nipple insertion portion 152d connected to a front end of the pressing force generation portion 152b through a connection pipe 152c having a reduced diameter.

Accordingly, the nipple coupling portion 140 may include a plurality of unit coupling members 141, and each of the unit coupling members may be formed at both ends thereof with bent portions 141a and 141b in the longitudinal direction, in which the rearward bent portion 141b is inserted between the pressing force generation portion 152b and the nipple insertion portion 152d inside a second body portion 112, and the front bent portion 141a is mounted to a front end of the nipple insertion portion 152d.

In addition, the nipple insertion portion 152d of the rotation member 152 may have an outer diameter gradually reduced rearward and the outer surface forms a taper.

Accordingly, the unit coupling members 141 forming the nipple coupling portion 140 may be deployed to be disposed to form a taper from a front side of the second body portion 112, a distance between the front sides of the unit coupling members 141 becomes narrow when the second body portion 112 moves forward, and the distance between the front sides of the unit coupling members 141 becomes wide when the second body portion 112 moves rearward.

In addition, the connection pipe 152c may be formed with a plurality of grease inlets 152f for introducing the grease, which flows into the rotational force generation portion 152b, into the nipple insertion portion 152d through the grease supply pipe 111c of the first body portion 111. The embodiment herein illustrates the connection pipe 152c having four grease inlets 152f. In other words, the grease inlet having a relatively large diameter may be formed through a center of the connection pipe 152c, or a plurality of grease inlets having a relatively small diameter may be formed through as in the present embodiment.

The elastic recovery member 153 is provided inside the rotation member 152, and pressed when the first body portion 111 moves forward to function to apply elastic force to the grease supply pipe 112 of the first body portion 111 rearward.

In addition, the second body portion 112 is provided therein with a rotation and fixation guide portion 112a for interaction with the push member 151, the rotation member 152 and the elastic recovery member 153 of the valve activation portion 150.

In other words, the rotation and fixation guide portion 112a of the second body portion 112 may include: a protrusion guide groove 112a-1 for guiding the guide protrusion 152a of the rotation member 152 along a lengthwise direction; a first inclined surface 112a-2 slantingly extending from one opened rear side of the protrusion guide groove 112a-1; a protrusion fixing groove 112a-3 connected to the first inclined surface 112a-2 to insert and fix the guide protrusion 152a guided to the first inclined surface 112a-2; and a second inclined surface 112a-4 slantingly extending from an opened rear side of the protrusion fixing groove 112a-3 and connected to an opposite side of the protrusion guide groove 112a-1 in which the first inclined surface 112a-2 does not extend.

In addition, the operation of the check valve 130 of the grease injection nipple 100 opened and closed and the operation of the nipple coupling portion 140 of the grease injection nipple 100 pressing the outer surface of the nipple of the grease supply target and coupled to the nipple will be described with reference to FIGS. 7 to 10, through the interaction between the rotation and fixation guide portion 112a of the second body portion 112 and the push member 151, rotation member 152 and elastic recovery member 153 of the valve activation portion 150.

FIGS. 7 to 10 are views sequentially illustrating an operating state of a grease injection nipple according to an embodiment of the present invention.

In other words, FIGS. 7 to 10 are views showing an interactive operation between the push member 151, the rotation member 152, and the elastic recovery member 153 of the valve activation portion 150 and the rotation and fixation guide portion 112a of the second body portion 112, in a three-dimensional state to be easily figured out.

Figure 7:
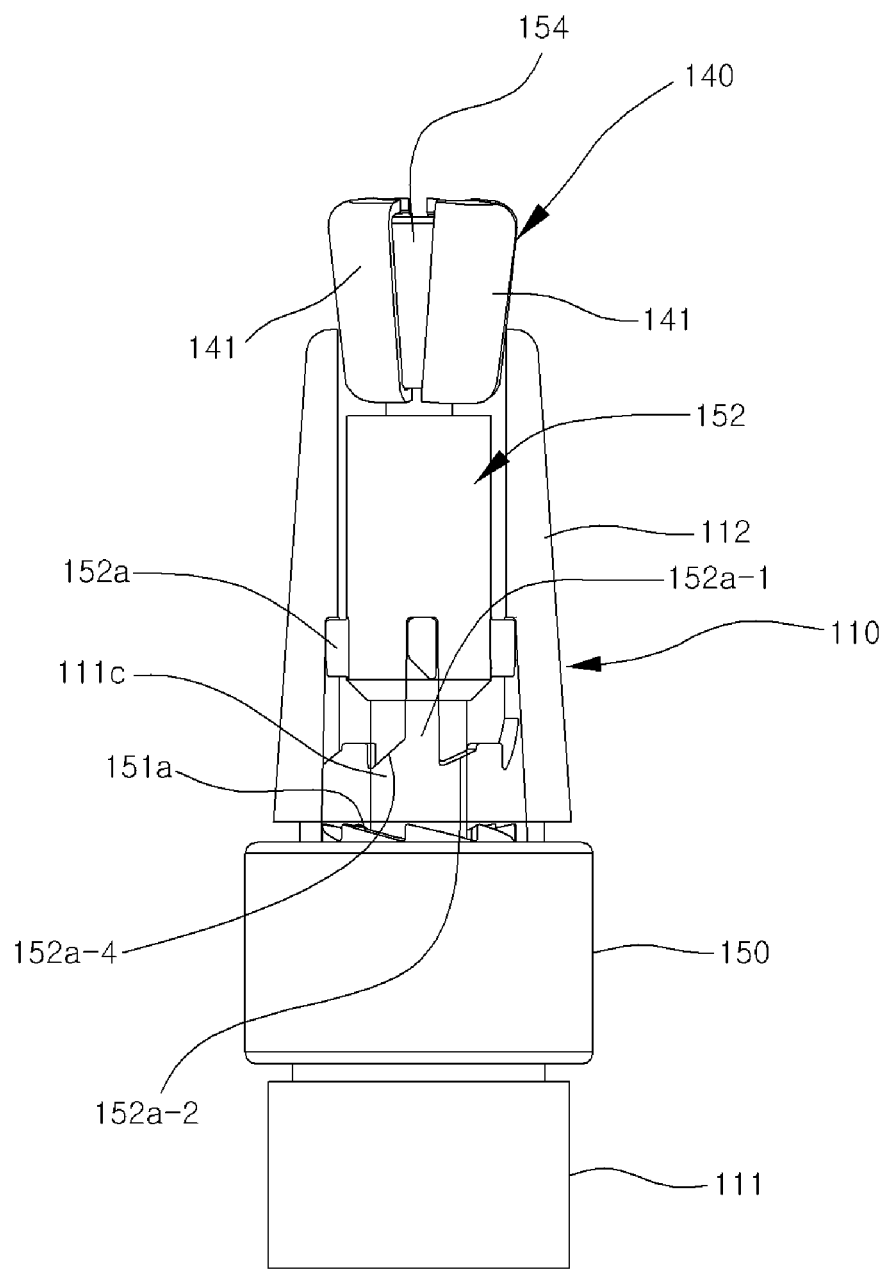
FIGS. 7 to 10 are views sequentially illustrating an operating state of a grease injection nipple according to an embodiment of the present invention.

First, FIG. 7 illustrates the state of FIG. 6, in which the guide protrusion 152a of the rotation member 152 is inserted into the protrusion guide groove 112a-1 of the rotation and fixation guide portion 112a of the second body portion 112, and moves to the front end of the protrusion guide groove 112a-1. FIG. 7 shows a state that the check valve 130 closes the grease supply pipe 111c of the first body portion 111.

Figure 8:
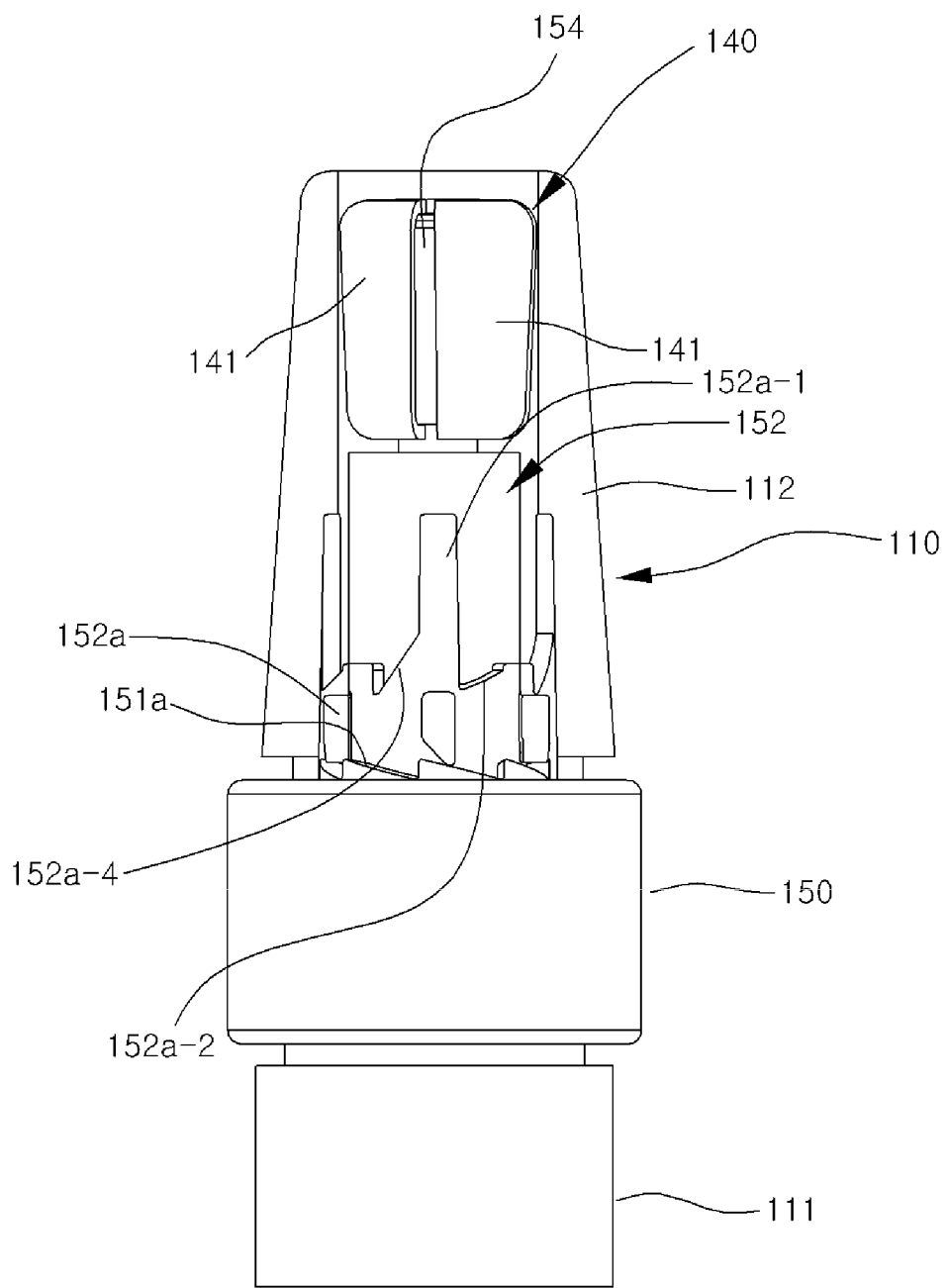

FIG. 8 is a view illustrating that, in the state of FIG. 7, the guide protrusion 152a of the rotation member 152 is released from the protrusion guide groove 112a-1 of the rotation and fixation guide portion 112a when the push body 110 moves forward, thereby being positioned at an upper end of one of the inclined surfaces on the rotation and fixation guide sill 151a of the push member 151. Herein, the nipple coupling portion 140 is inserted into the second body portion 112 of the push body 110, and the check valve 130 opens the grease supply pipe 111*b* of the first body portion 111.

In other words, FIG. 8 illustrates that the user pushes the nipple of the grease supply target after gripping the push body 110 of the grease injection nipple 100 so as to be inserted into the nipple coupling portion 140, as a result, the check valve 130 opens the grease supply pipe 111*c*, so that the grease is discharged into the rotation member 152 through the grease supply pipe 111*c*.

Figure 9:
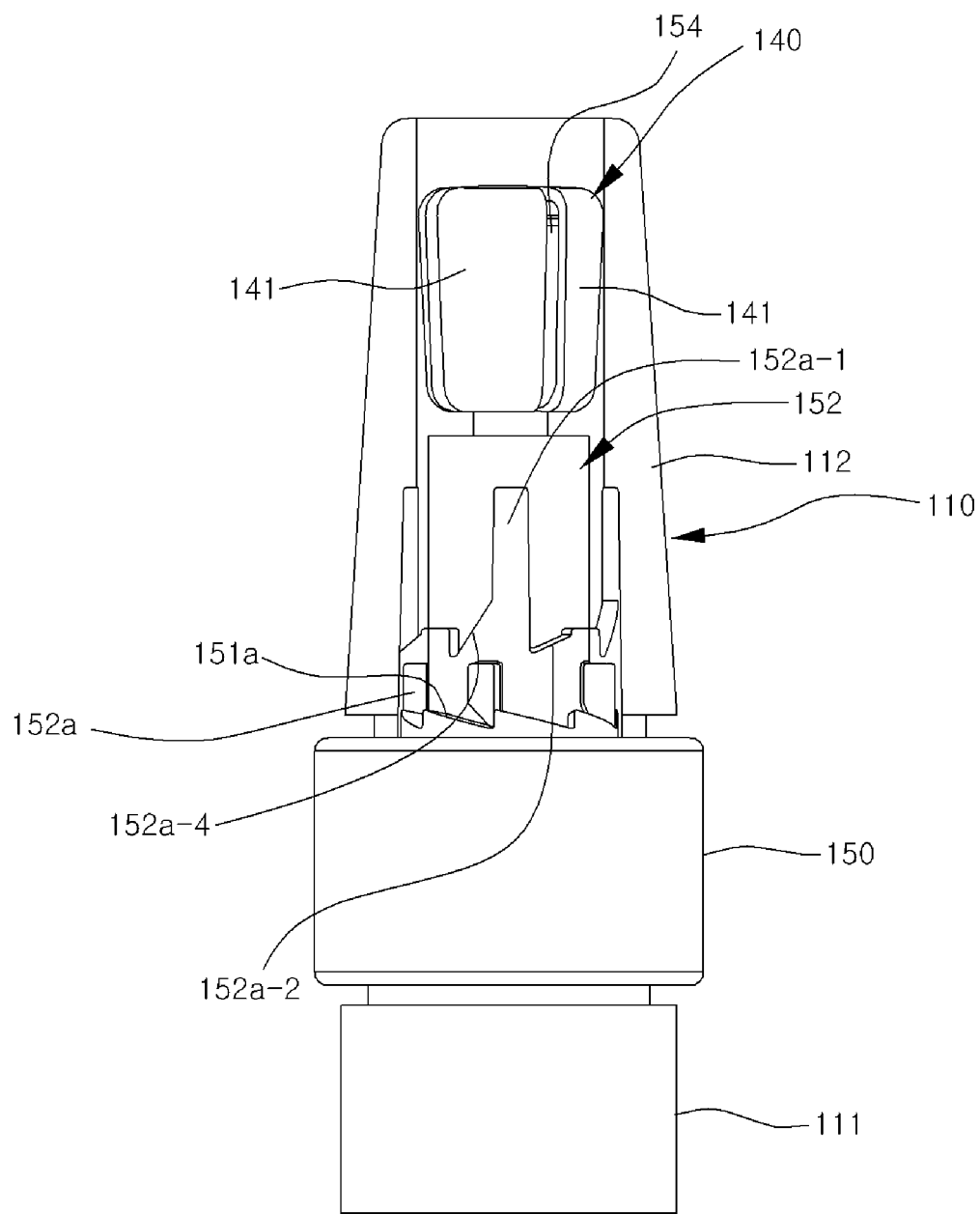

FIG. 9 illustrates that, in the state of FIG. 8, the guide protrusion 152*a* of the rotation member 152 moves along the inclined surface of the rotation and fixation guide sill 151*a* of the push member 151 when the push body 110 moves forward more, the rotation member 152 is rotated, and then the guide protrusion 152*a* is stuck to a boundary between the rotation and fixation guide sill 151*a* and the next rotation and fixation guide sill 151*a* which have moved along the inclined surface, so that further movement is prevented and the rotation of the rotation member 152 is stopped. Herein, the nipple coupling portion 140 is further inserted into the second body portion 112 of the push body 110.

In other words, FIG. 9 shows a process that the user continuously pushes the push body 110 of the grease injection nipple 100 in the direction of the nipple of the grease supply target. Herein, the check valve 130 opens the grease supply pipe 111*c* as in FIG. 8.

Figure 10:
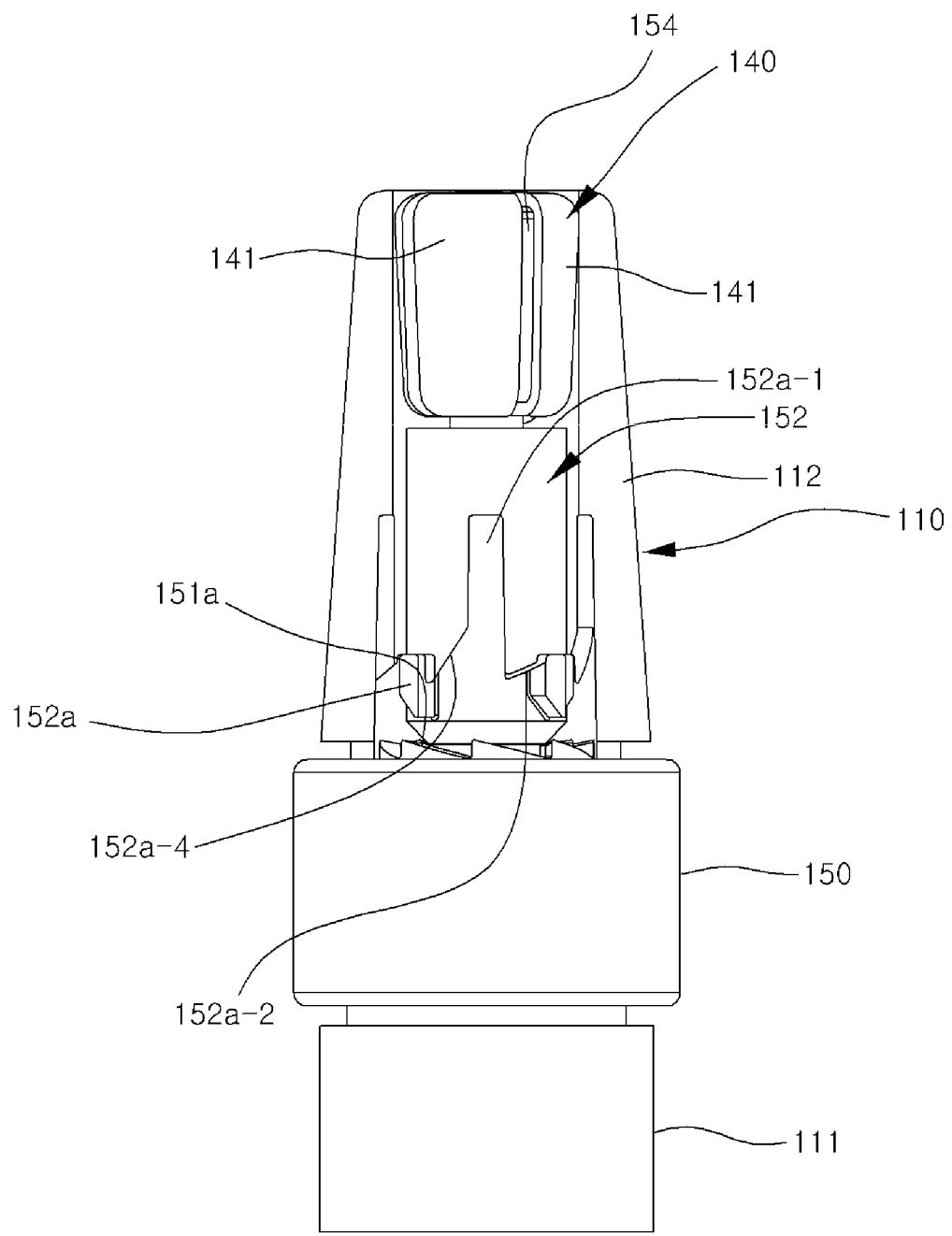

FIG. 10 illustrates that, in the state of FIG. 9, the elastic recovery member 153 provided inside the pressing force generation portion 152*b* of the rotation member 152 pushes the first body portion 111 backward when the push body 110 stops moving forward, accordingly, the push body 110 moves rearward, the guide protrusion 152*a* of the rotation member 152 comes into contact with the first inclined surface 112*a*-2 of the rotation and fixation guide portion 112*a* of the second body portion 112, the first body part 111 subsequently moves rearward, the guide protrusion 152*a* of the rotation member 152 moves along the first inclined surface 112*a*-2 of the rotation and fixation guide portion 112*a* so that the rotation member 152 is rotated, and then the guide protrusion 152*a* of the rotation member 152 is inserted into the protrusion fixing groove 112*a*-3 of the rotation and fixation guide portion 112*a* so that the movement of the guide protrusion 152*a* and the rotation of the rotation member 152 are stopped.

In other words, FIG. 10 illustrates that, in FIG. 9, the user releases the push body 110 of the grease injection nipple 100 to release the pushing force onto the push body 110, and thus the push body 110 is pushed backward and recovered through the elastic recovery member 153 inside the rotation member 152. Herein, the check valve 130 opens the grease supply pipe 111*c* as in FIGS. 8 and 9.

In addition, in FIGS. 8 to 10, the nipple coupling portion 140 is inserted into the rotation member 152 to press the outer surface of the nipple of the grease supply target, thereby maintaining the tight engagement with the corresponding nipple.

As shown from the above-described series of processes, according to the grease injection nipple 100 of the embodiment of the present invention, the grease is supplied through the opening of the check valve 130 just by pushing the push body 110 while the nipple of the grease supply target being inserted into the nipple coupling portion 140, the firm engagement with the nipple of the grease supply target is performed, and the grease leakage is prevented in the process of supplying the grease.

In addition, in the state of FIG. 10, when the push body 110 moves forward, the guide protrusion 152*a* of the rotation member 152 is released from the protrusion fixing groove 112*a*-3 of the rotation and fixation guide portion 112*a*, thereby coming into contact with the inclined surface of the push member 151. Herein, the elastic recovery member 153 is pressed by the grease supply pipe 111*c* of the first body portion 111 moving forward.

This corresponds the process that the user pushes the push body 110 forward to separate the grease injection nipple 100 from the nipple of the grease supply target, after the supply of grease to the nipple of the grease supply target is completed through the grease injection nipple 100.

In addition, when the push body 110 continues moving forward, the guide protrusion 152*a* of the rotation member 152 moves along the inclined surface of the push member 151, and accordingly, the rotation member 152 is rotated so that the guide protrusion 152*a* of the rotation member 152 is located on a rear side of the next rotation and fixation guide portion 112*a* located in the rotating direction. Herein, the elastic recovery member 130 is further pressed by the grease supply pipe 111*c* of the first body portion 111 which continuously moves forward.

In the above state, when the push body 110 stops moving forward, the restoring force of the elastic recovery member 130 is applied to the grease supply pipe 111*c* of the first body portion 111, so that the push body 110 moves rearward. In the above process, the guide protrusion 152*a* of the rotation member 152 comes into contact with the second inclined surface 112*a*-4 of the rotation and fixation guide portion 112*a*, and thus the guide protrusion 152*a* of the rotation member 152 moves along the second inclined surface 112*a*-4 of the rotation and fixation guide portion 112*a*, so that the rotation member 152 is rotated.

This corresponds to the state that, when the user releases the pushing force on the push body 110 forward, the rotation member 152 is rotated in association with the push body 110 being pushed backward by the restoring force of the elastic recovery member 153.

In addition, when the guide protrusion 152*a* of the rotation member 152 passes a forward end of the second inclined surface 112*a*-4, and is inserted into the protrusion guide groove 112*a*-1 of the next rotation and fixation guide portion 112*a* in the rotation direction, accordingly, the rotation member 152 stops rotating, and the guide protrusion 152*a* of the rotation member 152 moves to the forward end of the inserted protrusion guide groove 112*a*-1. In other words, the state of FIG. 7 is implemented, such that the check valve 130 closes the grease supply pipe 111*c* of the first body portion 111, and the nipple coupling portion 140 is deployed outwardly.

This means that, when the user releases the forward pushing force against the pushing body 110, the check valve 130 is switched to a closed state with respect to the grease supply pipe 111*c*, so that inner pressure of the grease supply pipe (not shown) connected to the grease injection nipple 100 does not affect the inside of the grease injection nipple 110, and the pressing force of the nipple coupling portion 140 is released with respect to the outer surface of the nipple of the grease supply target.

Therefore, when separating the grease injection nipple 100 from the nipple of the grease supply target, the user can separate the grease injection nipple from the grease nipple of the grease supply target by using a very easy operation of pulling the greasing nipple 100 backward with a weak force.

Returning again to FIGS. 1 to 6, the grease discharge member 154 and the stopper 155 included in the valve activation portion 150 will be described.

The grease discharge member 154 is provided inside the nipple coupling portion 140 while communicating with the rotation member 152.

The grease discharge member 154 is configured to be formed with a taper-shaped grease discharge hole 154a having a width gradually decreasing forward and formed through along the longitudinal direction, and have elasticity in which shrinkage and restoration are performed in accordance with the deployment of the nipple coupling portion 140.

Non-described reference numeral 154b and 154c denote guide members coupled to both sides of the grease discharge member 154.

The stopper 155 functions to restrict the second body portion 112 and the push member 151 to move rearward to prevent each one rearward end of the second body portion 112 and push member 151 from coming into contact with one side of the first body portion 111 extending the grease supply pipe 111c.

As shown from the above description with reference to FIGS. 2 to 10, the grease injection nipple according to the present invention may be coupled to the grease pipe and function as an opening/closing valve for the grease pipe.

In addition, the grease injection nipple is pushed against a nipple of a grease supply target and coupled thereto or separated therefrom such that the grease injection nipple can be easily fastened thereto and supply of grease or interruption of the supply simultaneously occurs and is interlinked therewith.

In addition, the grease injection nipple mounted on a grease gun, a grease pump, or the like can maintain a firm engagement with the nipple of the grease supply target without an additional supporting operation by user's hand or other external force in the process of supplying the grease in combination with the nipple of the grease supply target.

In addition, the grease injection nipple described with reference to FIGS. 2 to 10 may be applied to a grease injection nipple gun of a manual or automatic type in common, which has been described above.

Figure 11:
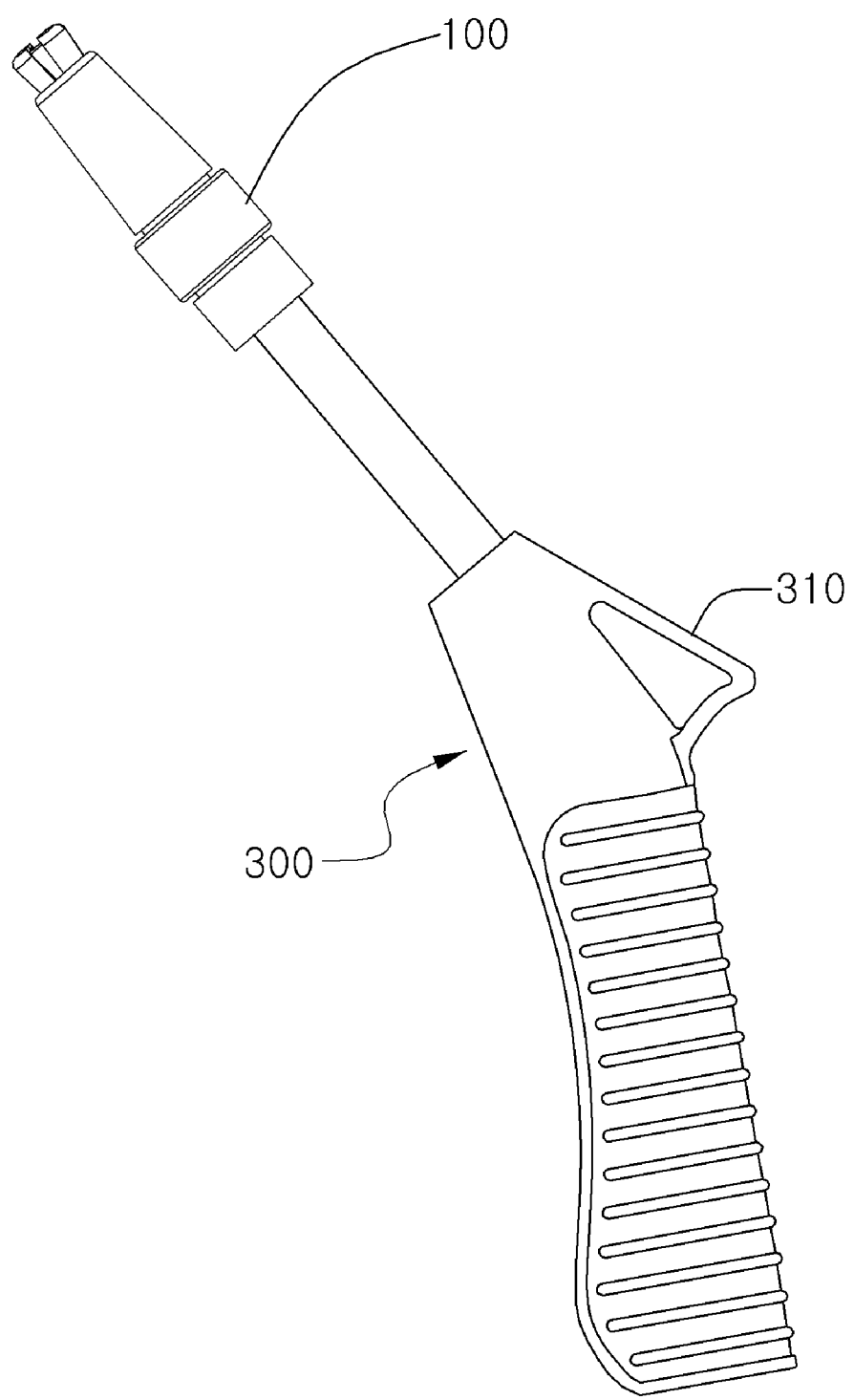
FIG. 11 is a view showing an example of a manual grease injection nipple gun applied with a grease injection nipple according to an embodiment of the present invention.

FIG. 11 illustrates a state that a grease injection nipple described with reference to FIGS. 2 to 10 is applied to the manual grease injection nipple gun.

As shown in the drawing, when the grease injection nipple 100 according to embodiments of the present invention in FIGS. 2 to 10 is applied to the manual grease injection nipple gun 300, a separate configuration to supply the grease is unnecessary for the manual grease injection nipple gun 300, so that a very simple structure including a handle 310 for a grip is implemented, and the operation for supplying the grease is very simple and convenient.

Figure 12:
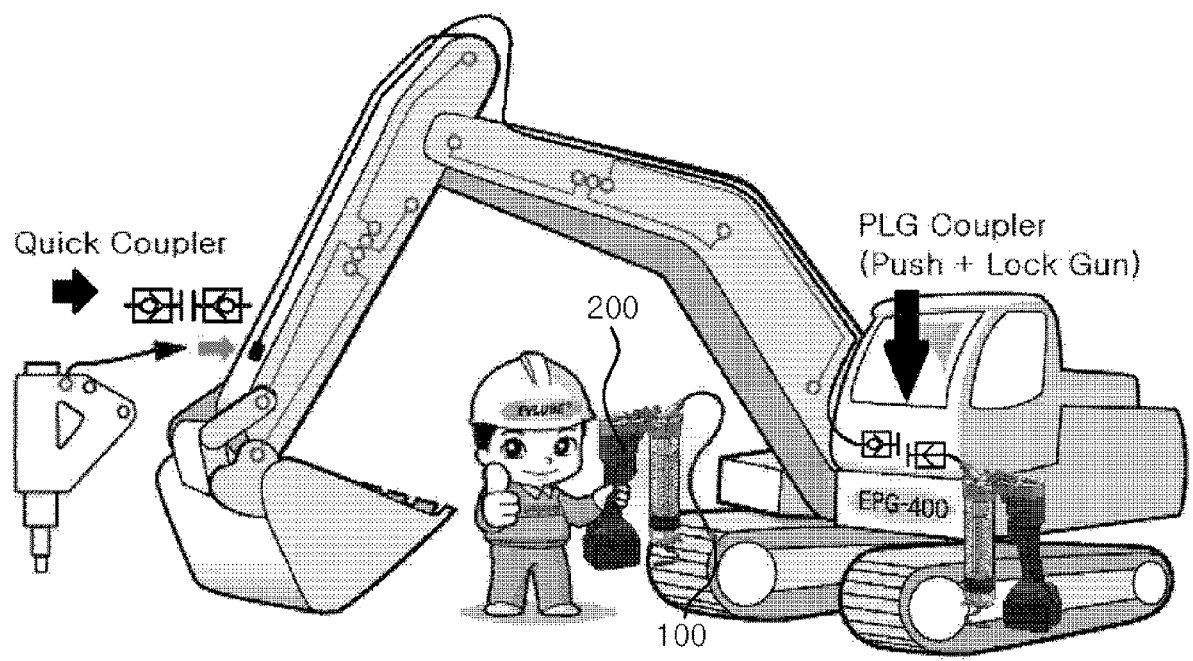
FIG. 12 is a view illustrating a state that a grease injection nipple according to an embodiment of the present invention is applied to a grease injection nipple gun and used for a hydraulic breaker such as heavy equipment or used as a gun functioning as an individual grease injection.

In addition, as illustrated in FIG. 12, the grease injection nipple gun 200 using the grease injection nipple 100 is applied to a hydraulic breaker such as heavy equipment, thereby serving as one element of an automatic grease supply system for the heavy equipment, and the grease injection nipple may be used as a gun having an individual grease injection function after separated as needed.

Although the invention has been described with the particulars such as specific elements, the limited embodiments, and the drawings, which are provided only to help comprehensive understanding of the invention, and the present invention is not limited to the embodiments. Accordingly, it is obvious to those skilled in the art that various changes and modifications may be made.

Therefore, the spirit of the present invention should not be limited to the aforementioned embodiments, and the following claims as well as all modifications or variations belonging to the equivalents of the claims will be within the scope of the invention.

[Description of Reference numerals]

| | |
|---|---|
| 100: grease injection nipple | 110: push body |
| 111: first body portion | 111a: first grease supply hole |
| 111b: second grease supply hole | |
| 111c: grease supply pipe | 111d: latching groove |
| 111e: O-ring | 112: second body portion |
| 112a: rotation and fixation guide portion | |
| 112a-1: protrusion guide groove | |
| 112a-2: first inclined surface | |
| 112a-3: protrusion fixing groove | |
| 112a-4: second inclined surface | |
| 112b: latching groove | 112c: fixing groove |
| 130: check valve | 131: valve body |
| 131a: valve head | 131b: valve bar |
| 132: elastic member | 140: nipple coupling portion |
| 141: unit coupling member | 141a, 141b: bent portion |
| 150: valve activation portion | 151: push member |
| 151a: guide sill | 151b: fixing protrusion |
| 152: rotation member | 152a: guide protrusion |
| 152b: pressing force generation portion | |
| 152c: connection pipe | 152d: nipple insertion portion |
| 152f: grease inlet | 153: elastic recovery member |
| 154: grease discharge member | 154a: grease outlet |
| 154b, 154c: guide member | 155: stopper |
| 160: a fastening member | |
| 200: manual grease injection nipple gun | 210: handle |

The invention claimed is:

1. A grease injection nipple comprising:
   a push body including a first grease supply hole formed rearward and a second grease supply hole extending forward while communicating with the first grease supply hole and having an inner diameter smaller than an inner diameter of the first grease supply hole, in which an inside of the push body communicates with the second grease supply hole while being opened forward;
   a check valve pressed forward to close a connection part between the first grease supply hole and the second grease supply hole of the push body;
   a nipple coupling portion having a rear side inserted into the inside of the push body, and
   having a deployed structure configured to allow the nipple coupling portion to be inserted more into the inside of the push body when the push body moves forward in order to increase force for pressing an outer surface of a nipple of a grease supply target inserted into the inside of the push body; and
   a valve activation portion for opening the check valve when the push body primarily moves forward, and closing the check valve when the push body secondarily moves forward after releasing external force for enabling the push body to primarily move.

2. The grease injection nipple of claim 1, wherein the push body comprises:
   a first body portion having the first grease supply hole formed rearward and a grease supply pipe, which is formed therein with the second grease supply hole and extends forward; and
   a second body portion in which the grease supply pipe is inserted through a rear side of the second body portion, and a rear side of the nipple coupling portion is inserted into one end of a front side of the second body portion.

3. The grease injection nipple of claim 2, wherein the first body portion and the second body portion are prepared as a single body or independently provided and coupled to each other.

4. The grease injection nipple of claim 3, wherein the first body portion and the second body portion prepared as independent bodies are formed along a periphery thereon with a latching groove, and
the push body further comprises a fastening member in which both front and rear ends of the fastening member are inserted into the latching grooves of the first body portion and the second body portion, respectively, to couple the first body portion to the second body portion.

5. The grease injection nipple of claim 2, wherein the valve activation portion comprises:
a push member formed inside the second body portion in which the grease supply pipe passes through the push member and a saw-tooth-shaped rotation and fixation guide sill is continuously formed along a circumferential direction of a front end of the push member;
a rotation member having a hollow structure extending in a longitudinal direction such that the grease supply pipe is inserted into a rear side of the rotation member, formed on an outer surface thereof with one or at least two guide protrusions disposed along a circumferential direction of the rotation member, and having a front outer side coupled to the nipple coupling portion; and
an elastic recovery member provided inside the rotation member and pressed when the push body moves forward to apply elasticity to a rear side of the first body portion, wherein
the second body portion is continuously formed on an inner circumferential surface thereof with a rotation and fixation guide portion including a protrusion guide groove for guiding the guide protrusion along a length direction, a first inclined surface slantingly extending from an opened rear side of the protrusion guide groove, a protrusion fixing groove connected to the first inclined surface such that the guide protrusion guided from the first inclined surface is fixedly inserted into the protrusion fixing groove, and a second inclined surface slantingly extending from the opened rear side of the protrusion fixing groove and connected to an opposite side of the protrusion guide groove from which the first inclined surface does not extend.

6. The grease injection nipple of claim 5, wherein the rotation member comprises a pressing force generation portion formed on a rear end thereof with the guide protrusion, and a nipple insertion portion connected to a front end of the pressing force generation portion through a connection pipe having a reduced diameter, and
the nipple coupling portion includes a plurality of unit coupling members each formed at both ends in the longitudinal direction thereof with bent portions in which a rearward bent portion is inserted between the pressing force generation portion and the nipple insertion portion inside a second push body, and a front bent portion is mounted to a front end of the nipple insertion portion.

7. The grease injection nipple of claim 6, wherein the nipple insertion portion has a tapered outer surface having an outer diameter gradually reduced rearward, and the unit coupling members are disposed to form a taper from a front side of the second push body and deployed such that a distance between the front sides of the unit coupling members becomes narrow when the second push body moves forward, and the distance between the front sides of the unit coupling members becomes wide when the second push body moves rearward.

8. The grease injection nipple of claim 5, wherein the push member is configured to have an independent structure in which at least one fixing protrusion is formed along a circumferential direction on the outer surface of the push member, and the fixing protrusion is inserted into the fixing groove formed on an inner surface of the second body portion and fixed to the inside of the second body portion.

9. The grease injection nipple of claim 6, wherein the valve activation portion further comprises an elastic grease discharge member provided inside the nipple coupling portion while communicating with the rotation member, formed with a tapered grease outlet which extends in a length direction and has a width gradually decreased forward, and contracted and recovered according to a deployment of the nipple coupling portion.

10. The grease injection nipple of claim 1, wherein the check valve comprises:
a valve body including a valve head having an inner diameter larger than an inner diameter of the second grease supply hole to open and close the second grease supply hole at a connection part between the first grease supply hole and the second grease supply hole, and a valve bar extending from the valve head with a reduced diameter and inserted into the second grease supply hole; and
an elastic member for applying elasticity to the valve head from an inside the first grease supply hole in a direction in which the valve head closes the connection part between the first grease supply hole and the second grease supply hole.

* * * * *